United States Patent
Arai et al.

(10) Patent No.: US 6,522,952 B1
(45) Date of Patent: Feb. 18, 2003

(54) METHOD AND SYSTEM FOR CONTROLLING COOPERATIVE OBJECT-TRANSPORTING ROBOT

(75) Inventors: Hirohiko Arai, Tsukuba (JP); Kazuo Tanie, Tsukuba (JP); Yasuo Hayashibara, Yokohama (JP); Yukinobu Sonoda, Kawashi (JP); Tomohito Takubo, Tsukuba (JP)

(73) Assignee: Japan as represented by Secretary of Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/774,173

(22) PCT Filed: Mar. 31, 2000

(86) PCT No.: PCT/JP00/02079

§ 371 (c)(1),
(2), (4) Date: Apr. 19, 2001

(30) Foreign Application Priority Data

Jun. 1, 1999 (JP) .......................... 11-153158
Jun. 1, 1999 (JP) .......................... 11-153263

(51) Int. Cl.[7] .............................................. G05B 15/00
(52) U.S. Cl. .................. 700/258; 700/245; 700/260; 700/261; 901/9; 901/16; 414/591; 414/719
(58) Field of Search ................................. 700/245, 260, 700/261, 258, 213; 901/2, 9, 14, 16, 34; 414/719, 591

(56) References Cited

U.S. PATENT DOCUMENTS 5,551,308 A * 9/1996 Arai et al. ............. 73/862.041
6,299,139 B1 * 10/2001 Kazerooni .................. 212/285
6,394,731 B1 * 5/2002 Konosu et al. ................ 414/5

FOREIGN PATENT DOCUMENTS

| JP | 63-200983 | 8/1988 |
|---|---|---|
| JP | 6-9589 (62-79058) | 2/1994 |
| JP | 7-205072 | 8/1995 |
| JP | 2000-176872 | 6/2000 |

OTHER PUBLICATIONS

English translation of Japanese article "Control of Man–machine System Based on Virtual Tool Dynamics" Apr., 1994, Kazuhir Kosuge et al.*

English translation of Japanese article "Motion Generation of Robots in Cooperation with Humans" Sep., 1998, Kazuhiro Kosuge et al.*

English translation of Japanese article "Experimental Evalution for a Robot Carrying an Object with a Human" Jun., 1998, Ikeura et al.*

Y. Hayashibara, et al., Proceeding of the 16th Annual Conference of the Robotics Society of Japan, vol. 1, pp. 107–108, "Study on Human Cooperative Behavior Under Carrying Long Objects," Sep. 18–20, 1998.

H. Kozawa, et al., The Japan of Mechanical Engineers, No. 983–1, pp. 305–306, "Variable Damping Control for a Robot Cooperating with Human and its Experimental Evalution," Mar. 6, 1998.

* cited by examiner

Primary Examiner—Khoi H. Tran
(74) Attorney, Agent, or Firm—Oblon, Spivak, McClelland, Maier & Neustadt, P.C.

(57) ABSTRACT

A control of a cooperative object-transporting robot which transports an object in cooperation with a man. The robot shares substantially a half of the weight of the object with the man, while the object is kept in a horizontal posture. A force applied to the robot by the object is detected by a force sensor, and based on the signal from the force sensor, a motion instruction is output for the motion components by the rotational force component $\tau_1$ around the horizontal axis and the translational force component $Fx_1$ in the horizontal back-and-forth direction, upon setting a gain to reduce the resistance forces of the robot to small values. The translational force component $F_y$ in the direction of the object short axis is constrained so that no translational motion in the direction of the object short axis occurs.

3 Claims, 4 Drawing Sheets

METHOD AND SYSTEM FOR CONTROLLING COOPERATIVE OBJECT-TRANSPORTING ROBOT

TECHNICAL FIELD

The present invention relates to a method and system for controlling a cooperative object-transporting robot usable in heavy article transport operations in the mining and manufacturing industries, the agriculture, forestry, and fishery industries, the construction industry, the distribution industry, homes, etc.

BACKGROUND ART

One of object-transporting methods in which a man and a robot cooperatively transport an object, is a method called "power assist" which has been studied by the California University, the Tohoku University, the Mechanical Engineering Laboratory of the Agency of Industrial Science and Technology, etc. This is a technique in which there are provided two force sensors for detecting the load of an object grasped by the tip of a robot arm and a force applied by an operator, respectively, and in which the robot reduces the load of the operator while moving so as to copy after the motion of the operator, by amplifying the force applied by the operator and then applying the amplified force to the object.

However, in accordance with this method, it is necessary for the operator to grasp a force sensor handle disposed at the tip of the robot arm and to move it, and hence the place where a force can be applied is limited to only one portion of the object. When transporting a long object or a large-sized object, as shown in FIG. 1, it is desirable that a hand 2 attached at the tip of the robot arm 1 and a human operator 3 grasp, for example, each of the ends of the object 4 and support the object 4. However, in this case, while a force can be measured on the robot arm 1 side by providing a force sensor 5, a force applied to the object 4 cannot be directly measured on the operator 3 side. This makes it difficult to apply the above-described "power assist" technique.

On the other hand, the Stanford University in U.S., the Tohoku University, etc. has studied a method in which a man and a robot support an object at some portions thereof and in which they transport the object while sharing the load therebetween. This method is primarily based on impedance control. Specifically, in this method, an object is supported under weightless conditions by compensating for the weight of the object, and simultaneously virtual impedances (inertia, viscosity, and spring coefficient) are set with respect to the object or the robot, whereby the motion of the object is changed in response to the change in the force applied by the man, and the motion of the object is caused to copy after the motion of the man.

In order to compensate for the gravity acting on the object, however, it is necessary to know in advance the mass or the mass distribution of the object. This hinders this method from being flexibly applied to the transportation of various objects.

When the object is a long object, it is virtually only a translational force which a man can apply. It is difficult to apply a torque (rotational force) to one end of an object to be transported. In the case of a control based on impedance control, a straight-ahead motion in the direction of the long axis obtained by connecting the man and the robot is easy, but with regard to a motion including rotation, it is difficult for man to positionally control the end point of the robot side as a target point. In order to move the body by applying a small force, it is necessary to set impedance parameters such as inertia and viscosity to be low values. In this case, however, a drift (slipping motion) in the normal direction is generated, and the drift is difficult to stop. This raises a problem that it is difficult to intuitively forecast behavior of the object.

The reason that the above-described problems associated with the conventional art is caused is because the impedance parameters are set to be uniform in all directions, and also they are set to be in an absolute coordinate space. As a result, behavior of the object becomes one which man has never daily experienced, so to speak, a case like as if the object floating in a weightless space were moved by a force applied. This makes operations of making the object reach a target position and posture difficult.

DISCLOSURE OF INVENTION

It is an object of the present invention to solve the above-described problems, and to achieve a controlling means for making the arm of a cooperative object-transporting robot share approximately a half of the weight of an long object, in the robot control in which a man and the robot grasp each of the ends of the long object, sharing the load due to the weight thereof.

It is another object of the present invention to achieve a controlling means for a cooperative object-transporting robot, the controlling means having only to have one sensor for measuring a force applied to the robot arm by an object, as a force sensor, without the need to have a sensor for measuring a force by an operator, and the controlling means not being required to know the dimensions and the mass of the object in advance.

It is still another object of the present invention to permit a man to intuitively perceive the behavior of the object by the daily senses thereof in the control for the above-described cooperative object-transporting robot, by simplifying the relationship between the force applied by the man and the motion of the object by limiting the direction in which the object is movable.

It is a further object of the present invention to achieve a controlling means for a cooperative object-transporting robot, the controlling means permitting a man to intuitively perceive the above-described behavior of the object by the daily senses, without deviating from the original operational purpose of making the object reach arbitrary target position and posture.

In order to achieve the above-described purposes, the controlling method in accordance with the present invention, which is essentially a controlling method for controlling the cooperative object-transporting robot in order that a man and the robot transport a long object or a large-sized object while grasping each of the ends thereof, is characterized in that an angle of the hand-tip of the robot is detected by angle sensors, and that, based on the sensor signals, a motion instruction for a translational motion of the hand-tip in the vertical direction is output so as to keep the posture of the object horizontal.

The above-described controlling method may be such that a force applied to the robot by the object and an angle of the hand-tip of the robot are detected by sensors, and that, based on the sensor signals, a motion instruction to drive the robot arm is output for the rotational motion component around the horizontal axis and the translational motion component in the horizontal back-and-forth direction, upon setting a gain so as to reduce the resistance forces of the robot to small values.

On the other hand, the controlling system in accordance with the present invention is essentially a controlling system for controlling the cooperative object-transporting robot in order that a man and the robot transport a long object or a large-sized object while grasping each of the ends thereof, and is characterized by angle sensors for detecting an object-grasping angle of the hand-tip of the robot, a motion converting part for outputting the motion component of the hand-tip in the vertical direction so as to keep the posture of the object horizontal, based on the hand-tip angle detected by the angle sensors, and a coordinate converting part for outputting a motion instruction to drive the robot arm, based on the above-mentioned motion component.

The above-described controlling system may comprise a force sensor for detecting a force applied to the robot by the object, a coordinate converting part for separating the rotational force component around the horizontal axis and the translational force component in the horizontal back-and-forth direction, from the sensor signal of the force sensor, a force-motion converting part for outputting these motion components, using a gain such as to reduce the resistance forces of the robot in these rotational direction and translation direction to small values, based on the above-mentioned two force components, and a coordinate converting part for synthesizing these motion components and outputting a motion instruction to drive the robot arm.

In accordance with the controlling means for the cooperative object-transporting robot having the above-described constitution, when controlling the cooperative object-transporting robot which is arranged so that a man and the robot grasp each of the ends of the object, and that they transport the object sharing the load due to the weight thereof, it is possible to control so that the robot arm shares approximately a half of the weight of the object, by controlling the translational motion of the hand-tip in the vertical direction so as to keep the posture of the object horizontal. Simultaneously, it is possible to control the rotational motion of the hand-tip of the robot so that the rotational force at the hand-tip thereof becomes zero. As a force sensor, it is essential only that one sensor for measuring a force applied to the robot arm by an object is provided. There is no need for sensor for measuring a force by an operator. Also, it is unnecessary to know in advance the dimensions and the mass of the object.

Next, a second controlling method is a controlling method for controlling the cooperative object-transporting robot in order that a man and the robot transport a long object or a large-sized object in a horizontal plane while grasping each of the ends thereof, and is characterized in that a force applied to the robot by the object is detected by a force sensor, and that, based on the rotational force component around the vertical axis, and the translational force component in the direction of the object long axis obtained by connecting the point grasped by the man and the point grasped by the robot, each of which is separated from the sensor signal, the above-mentioned rotational motion component around the vertical axis and the above-mentioned translational motion component in direction of the object long axis are output, upon setting a gain so as to reduce the resistance forces of the object to small values, while the translational force component in the direction of the object short axis orthogonal to above-mentioned object long axis is constrained so that no translational motion in the direction of the object short axis occurs, whereby a motion limitation equivalent to the object being supported by a virtual wheel facing the direction of the object long axis, at one point on the robot side, is imposed on the object, and then the robot arm is driven. Furthermore, in such a controlling method, the control may also be performed on the precondition that an angle of the hand-tip of the robot is detected by angle sensors, and that, based on the sensor signals, a motion instruction for a translational motion of the hand-tip in the vertical direction is output so as to keep the posture of the object horizontal.

Moreover, a second controlling system is a controlling system for controlling the cooperative object-transporting robot in order that a man and the robot transport a long object or a large-sized object in a horizontal plane while grasping each of the ends thereof, and is characterized by a force sensor for detecting a force applied to the robot by the object, a coordinate converting part for separating, from the sensor signal, the rotational force component around the vertical axis, the translating force component in the direction of the object long axis obtained by connecting the point grasped by the man and the point grasped by the robot, and the translating force component in direction of the object short axis orthogonal thereto, a force-motion converting part which, based on the above-mentioned rotational force component around the vertical axis and the above-mentioned translational force component in the direction of the object long axis, outputs these motion components, using a gain such as to reduce the resistance forces of the robot in these rotational direction and translation direction, and a coordinate converting part for synthesizing these motion components and the above-mentioned translational force component in the direction of the object short axis which is set to be zero, and outputting a motion instruction to drive the robot arm.

In accordance with the controlling means for the cooperative object-transporting robot having the above-described constitution, when controlling the cooperative object-transporting robot which is arranged so that a man and the robot transport a long object or a large-sized object in the horizontal plane while grasping each of the ends thereof, a motion limitation equivalent to the object being supported by a virtual wheel facing the direction of the object long axis, at one point on the robot side, is imposed on the object, and thereby the direction in which the object is movable is limited. This simplifies the relationship between the force applied by the operator and the motion of the object, and permits the operator to intuitively perceive the behavior of the object by daily senses thereof. In addition, there is no fear of deviating from the original operational purpose of making the object reach arbitrary target position and posture.

BEST MODE FOR CARRYING OUT THE INVENTION

When a man and the robot cooperatively transport an object while grasping each of the ends of the object, the most important thing is how the weight of the object is to be shared therebetween. In general, if the object is supported only by a translational force without applying a torque (rotational force) at the point where the object is supported, a vertical force will be distributed in an inverse proportion to the distance from the barycenter of the object. In many cases, a long object has a substantially uniform mass distribution, and hence, if no torque is applied to the object by the tip of the robot and the tip of the object is freely rotatable, the man and the robot will share the weight substantially half-and-half, irrespective of the mass and dimensions of the long object.

Meanwhile, in the transportation of a long object, the object will be transferred while keeping the posture thereof horizontal in the majority of cases. It is therefore preferable that the vertical motion of the robot tip be controlled so that the tilt of the object is canceled out. Specifically, when the object tilts by being lifted by the man, the tilt of the object will be canceled out and the object will be able to keep the posture thereof horizontal if the robot is caused to lift the object, as well. The same goes for the case where the object is lowered.

With regard to a horizontal motion of the object, it is preferable that the robot move so as to copy after the force applied to the body by the man. That is, if virtual inertia and viscosity are set with respect to the horizontal motion of the robot tip, and sufficiently low values thereof are selected, it will be possible to realize a motion copying after that of the man without providing a resistance force to the man.

Figure 1:
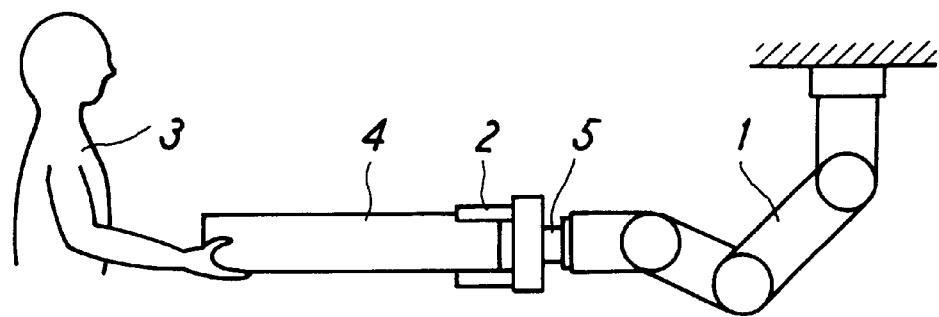
FIG. 1 is an explanatory view for a cooperative object-transporting robot controlled based on the present invention.
Figure 2:
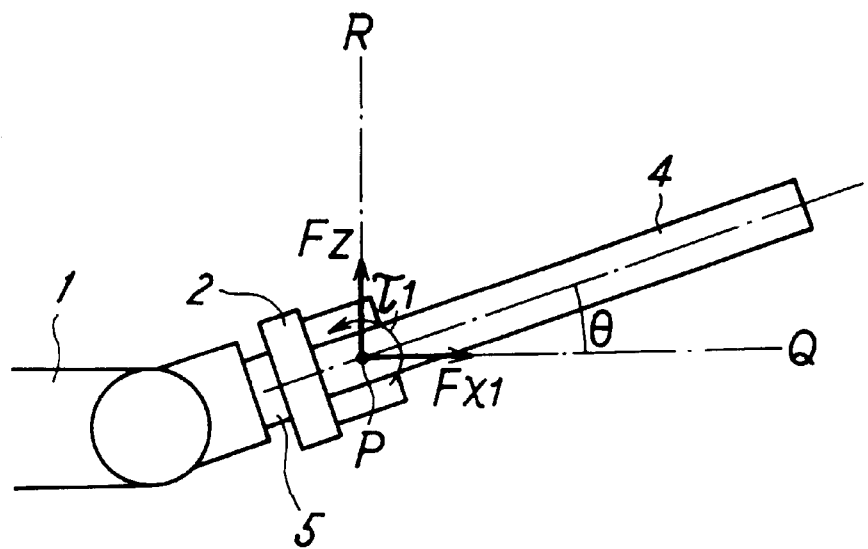
FIG. 2 is an explanatory view for the detected output component of the force sensor used in a first control of the cooperative object-transporting robot in accordance with the present invention.

Specifically, as shown in FIGS. 1 and 2, a force sensor 5 is provided between a robot arm 1 and a hand 2 disposed at the tip thereof, and by this force sensor 5, a force applied to the robot arm 1 side by the operator side Q via an object 4 is detected at an object-supporting point P on the robot side of the object 4. Then, the signal obtained is analyzed into the translational force component $Fx_1$ in the horizontal back-and-forth direction (PQ direction), the translational force component Fz in the vertical direction (PR direction), and the rotational force component $\tau_1$ around the horizontal axis around the point P.

Although not shown in the figures, each of the joints of the robot arm has a joint actuator for driving each of the joints, and has an angle sensor for detecting the joint angle. A tilt angle θ of the object is detected based on sensor signals of these angle sensors.

With regard to the translational force component $Fx_1$ in the horizontal back-and-forth direction and the rotational force components $\tau_1$, the horizontal velocity at the point 4 on the object and the rotational velocity at the hand-tip are determined so that the robot moves without resistance with respect to respective direction. Also, the vertical velocity at the point P for making the posture of object 4 horizontal in proportion to the tilt angle θ of the object 4, is determined.

For these purposes, based on the rotational force component $\tau_1$ around the horizontal axis and the translational force component $Fx_1$ in the horizontal back-and-forth direction in a sensor signal of the force sensor 5, the robot arm is driven by outputting the rotational motion component around the horizontal axis and the translational motion component in the horizontal back-and-forth direction, upon setting a gain so as to reduce the resistance forces of the robot to small values. On the other hand, with regard to the hand-tip angle (tilt angle θ of the object 4) detected by the angle sensors at the hand-tip, a motion instruction is output for a translational motion in the vertical direction in proportion to the hand-tip angle, and thereby the hand-tip of the robot arm is driven upward and downward so as to keep the posture of the object horizontal.

In this way, around the point (point P in FIG. 2) where the robot supports the object, since the object is freely rotatable and no torque is applied to the object, the forces by the man and the robot in the vertical direction become substantially half-and-half in accordance with the mass distribution of the long object. Also, when the man applies a horizontal force to the object, the robot moves horizontally following it without resistance. When the object tilts by being lifted by the man, a velocity upward in the vertical direction such as to make the tilt angle zero occurs in the hand-tip of the robot, and hence the object rises while keeping the posture thereof horizontal. The same goes for the case where the object grasped by the mans is lowered.

It can be said that such a control is a control in which an impedance control is performed with respect to the horizontal direction while an initial state of the object is maintained with respect to the vertical direction.

Figure 3:
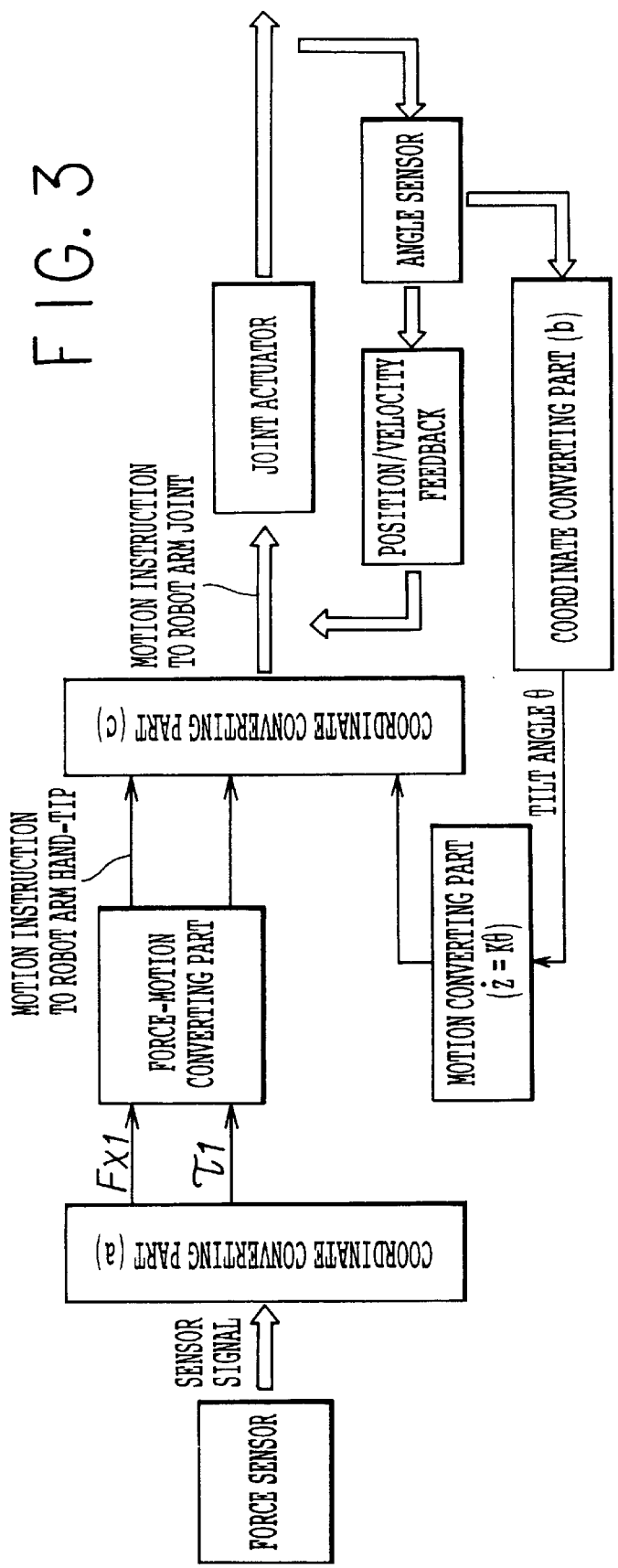
FIG. 3 is a construction view showing the first control system of the cooperative object-transporting robot in the present invention.

In order to execute the above-described controlling method, a system described hereinafter with reference to FIGS. 2 and 3 may be used.

As shown in FIG. 2, the tip of a robot arm 1 need to have a hand 2 for grasping an object 4 and a force sensor 5 for detecting a force applied by an operator via the object 4. Also, as described above, each of the joints of the robot arm has an joint actuator for driving each of the joints, and has an angle sensor for detecting the joint angle. Meanwhile, as these joint actuators and angle sensors, those which are generally provided for robot arms which are subjected to a drive control, are utilized as they are.

The sensor signal detected by the force sensor 5 is input to a controlling system (computer). In this controlling system, as shown in FIG. 3, the translational force component $Fx_1$ in the horizontal back-and-forth direction, the translational force component Fz in the vertical direction, and the rotational force component $\tau_1$ around the horizontal axis are separated in a coordinate converting part (a).

On the other hand, in the angle sensor of each of the joints of the robot arm, a tilt angle θ of the object 4 is measured.

In a force-motion converting part, based on the above-described translational force component $Fx_1$ in the horizontal back-and-forth direction, the translational motion component (velocity and acceleration) in the PQ direction at the point P in FIG. 2 is determined by the operation such as the following equation (1). Also, based on the rotational force component $\tau_1$ around the horizontal axis, the rotational motion component (angular velocity and angular acceleration) around the point P is determined by the operation such as the following equation (2). These are determined based on the setting of the gain such as to reduce the resistance forces of the robot in the rotation direction and the translation direction to small values.

$$Fx_1 = M\ddot{x} + Bx\,\dot{x} \rightarrow \ddot{x} = Fx_1 - \frac{Bx\,\dot{x}}{M}, \quad \dot{x} = \int \ddot{x}dt \qquad (1)$$

$$\tau_1 = I\,\ddot{\theta} + Bd\,\dot{\theta} \rightarrow \ddot{\theta} = \frac{\tau_1 - Bd\,\dot{\theta}}{I}, \quad \dot{\theta} = \int \ddot{\theta}dt \qquad (2)$$

Here, in order to reduce the resistance forces of the robot to small values, a target inertia coefficient M, a target inertia moment coefficient I, a target viscous friction coefficient Bx, and a target viscous friction coefficient Bd are each set to be low values.

On the other hand, based on the tilt angle which has been detected by the angle sensors and which has been determined in a coordinate converting part (b), the translational motion component (velocity) in the vertical direction at the point P is determined in a motion converting part, as being proportional to the tilt angle θ of the object, as shown in equation (3).

$$\dot{z} = K\theta \tag{3}$$

A coordinate converting part (c) synthesizes the above-described motion components, thereby determines the motion of the hand-tip of the robot arm 1, and outputs a motion instruction to drive each of the joint actuators. The motion of each of the joint actuators is detected by the angle sensor provided at each of the joints, and the position and the driving velocity of each of the joints are fed back so that the motion of the robot arm approaches the target values.

Figure 4:
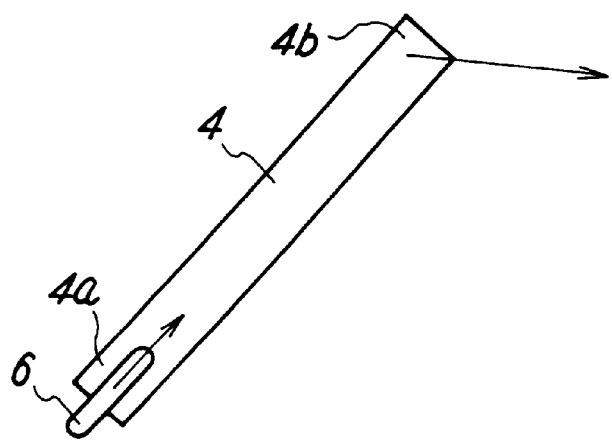
FIG. 4 is a conceptual explanatory view for a second control in accordance with the present invention.

Next, the second controlling means in accordance with the present invention will be described with reference to FIGS. 4 through 6. In this control, the following method and system may be constituted on the precondition that the above-described hand-tip angle of the robot is detected by the angle sensors, and that, based on the sensor signals, a motion instruction is output for a translational motion in the vertical direction so as to keep the posture of the object horizontal.

Man frequently experiences daily an operation in which an object is placed on a cart having passive wheels, and in which the object is carried while the cart is pushed on a horizontal floor, when using a single-wheel carrier (so-called "wheelbarrow"), a shopping cart, a baby carriage, a table wagon, or the like.

In these cases, the direction in which the cart is movable is momentarily limited by the direction of the wheels. Specifically, in the direction in parallel with the wheels, the cart can be moved to and fro by the rotation of the wheels, but in the direction in orthogonal to the wheels, the cart cannot be moved unless the wheels are slipped sideway against the friction between the floor surface and the wheels. Such a kind of motion limitation is called a "nonholonomic constraint".

Despite of such a limitation of the motion direction, it is possible to ultimately make the cart reach arbitrary target position and posture by pushing the cart along an appropriate trajectory, and this has been mathematically verified. In reality, man has generally a skill to practice it based on daily experiences.

As shown in FIG. 1, even when the hand 2 of the robot arm 1 and the operator 3 grasp each of the sides of a long object or a large-sized object 4, and cooperatively transport it face to face in a horizontal plane, the man can intuitively perceive the behavior of the object if he/she controls the robot so that the object 4 conducts the same behavior as that of the cart. This makes it possible to easily make the object reach a target position and posture. For this purpose, as illustrated in FIG. 4, a motion limitation such that the object 4 is supported by a virtual wheel 6 facing the object long axis, on the robot side 4a, is preferably imposed on the object 4. This permits the operator side 4b to perform the same operation as the case where the operator side transports the object while pushing the cart in an appropriate direction which is exemplified by the arrow.

Figure 5:
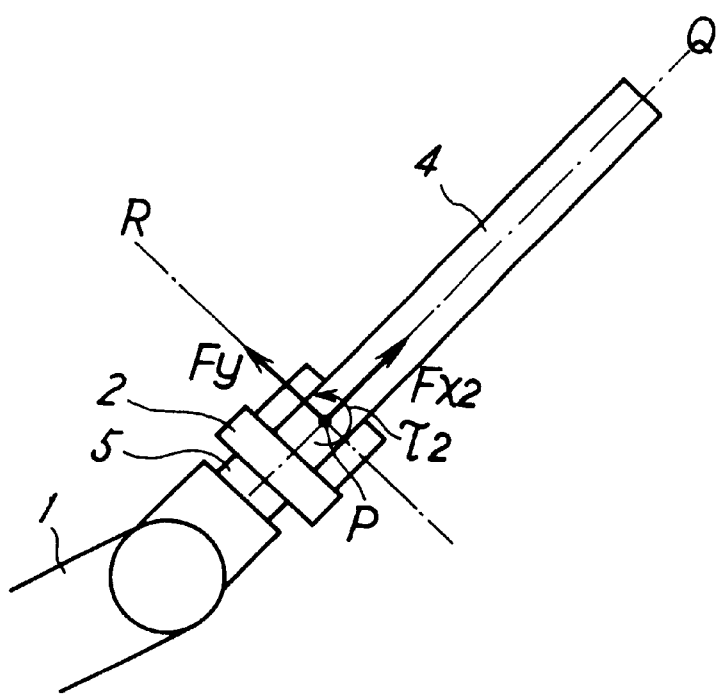
FIG. 5 is an explanatory view for the detected output component of the force sensor used in the second control of the cooperative object-transporting robot in accordance with the present invention.
Figure 6:
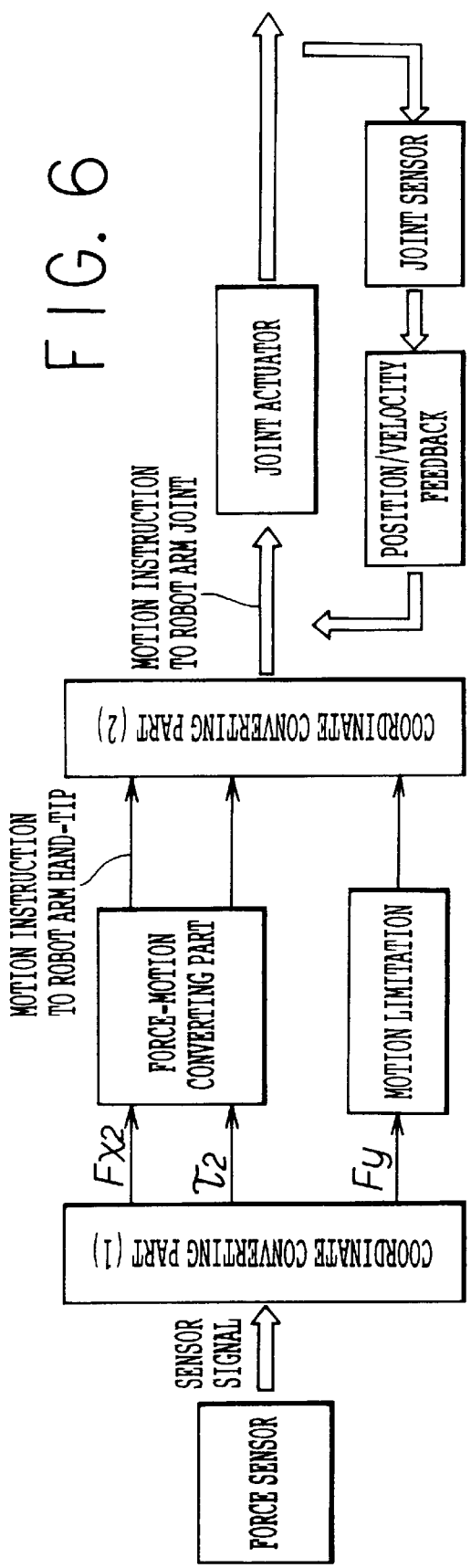
FIG. 6 is a construction view showing the second control system of the cooperative object-transporting robot in the present invention.

Specifically, as illustrated in FIG. 5, a force sensor 5 is provided between a rod arm 1 and a hand 2 disposed at the tip thereof, and by this force sensor 5, a force applied to the robot arm 1 side by the operator side Q via an object 4 is detected at one point P on the robot side of the object 4. Then, the signal obtained is analyzed into the translational force component $FX_2$ in the direction (PQ direction) of the object long axis obtained by connecting the operator and the robot, the translational force component Fy in the direction (PR direction) orthogonal thereto, and the rotational force component $\tau_2$ around the vertical axis at the point P. With regard to the rotational force component $\tau_2$ and the translational force component $Fx_2$ in the long axis direction, the robot is permitted to move without resistance with respect to respective direction, while, with regard to the translational force component Fy, the motion of the robot is limited. This results in that an equivalent motion limitation to the object 4 being supported by a virtual wheel facing the direction of the object long axis, at the point P, is imposed on the object.

For these purposes, based on the rotational force component $\tau_2$ around the vertical axis and the translational force component $FX_2$ in the direction of the object long axis in a sensor signal of the force sensor 5, the rotational motion component around the vertical axis and the translational motion component in direction of the object long axis are output, upon setting a gain so as to reduce the resistance forces of the robot to small values. On the other hand, the translational force component Fy in the direction of the object short axis is constrained so that no translational motion in the direction of the object short axis occurs, and then the robot arm is driven. Herein, this constraint for preventing the translational motion component in direction of the object short axis from occurring is achieved by outputting the motion instruction such that the motion component in the direction of the object short axis becomes substantially zero.

In this way, the point P on the object 4 shown in FIG. 5 is permitted to translate only in the PQ direction. In addition, the point P is permitted to be rotated therearound. Furthermore, the point P is also permitted to successively vary the travelling directions thereof while proceeding along a smooth curved trajectory tangent to the straight line PQ. Since the behavior of the object 4 is the same as the case where it is supported by the wheel at the point P, the operator can intuitively make the object reach a target position and posture, using the same skill as the case where the operator pushes a cart.

In order to execute the above-described first controlling method, a second system described hereinafter with reference to FIGS. 5 and 6 may be used.

As shown in FIG. 5, the tip of the robot arm 1 need to have a hand 2 for grasping an object 4 and have a force sensor 5 for detecting a force applied by an operator via the object 4. The sensor signal detected by the force sensor 5 is input to a controlling system (computer). In this controlling system, as shown in FIG. 6, the translational force component $Fx_2$ in the direction of the object long axis, the translational force component Fy in the direction of the object short axis, and the rotational force component $\tau_2$ around the vertical axis are separated in a coordinate converting part (1).

In a force-motion converting part, the translational motion component (velocity and acceleration) in the PQ direction at the point P in FIG. 5 is determined based on the above-described translational force component $Fx_2$ in the direction of the object long axis, and the rotational motion component (angular velocity and angular acceleration) around the point P is determined based on the rotational force component $\tau_2$ around the vertical horizontal axis. The determination of these motion components is based on the setting of a gain such as to reduce the resistance forces of the robot in the rotation direction and the translation direction to small values. On the other hand, with regard to the translational force component Fy in the direction of the short axis, the translational motion component (velocity and acceleration) in the PR direction, at the point P, is set to be zero irrespective of the output of the force sensor. These motion components are synthesized in a force-motion converting part (2), and a motion instruction to drive each of the joint actuators of the robot arm 1 is output. The motion of each of the joint actuators is detected by an angle sensor provided at each of the joints, and the position and the driving velocity of each of the joints are fed back so that the motion of the robot arm approaches the target values.

What is claimed is:

1. A method for control a cooperative object-transporting robot, in which a man and a robot transport a long object or a large-sized object in a horizontal plane while grasping each of the ends of the object, wherein:

a force applied to the robot by the object is detected by a force sensor, and based on the rotational force component around the vertical axis, and the translational force component in the direction of the object long axis obtained by connecting the point grasped by the man and the point grasped by the robot, each of which is separated from the sensor signal, said rotational motion component around the vertical axis and said translational motion component in the direction of the object long axis are output, upon setting a gain so as to reduce the resistance forces of the object to small values, while the translational force component in the direction of the object short axis orthogonal to said object long axis is constrained so that no translational motion in the direction of the object short axis occurs, whereby a motion limitation equivalent to the object being supported by a virtual wheel facing the direction of the object long axis, at one point on the robot side, is imposed on the object, and then the robot arm is driven.

2. A method as claimed in claim 1, wherein:

an angle of the hand-tip of the robot is detected by angle sensors, and based on the sensor signals, a motion instruction for a translational motion of the hand-tip in the vertical direction is output so as to keep the posture of the object horizontal.

3. A system for control a cooperative object-transporting robot, in which a man and a robot transport a long object or a large-sized object in a horizontal plane while grasping each of the ends of the object, said system comprising:

a force sensor for detecting a force applied to the robot by the object;

a coordinate converting part for separating, from the sensor signal, the rotational force component around the vertical axis, the translating force component in the direction of the object long axis obtained by connecting the point grasped by the man and the point grasped by the robot, and the translating force component in direction of the object short axis orthogonal thereto;

a force-motion converting part which, based on said rotational force component around the vertical axis and said translational force component in the direction of the object long axis, outputs these motion components, using a gain such as to reduce the resistance forces of the robot in these rotational direction and translation direction; and a coordinate converting part for synthesizing these motion components and said translational force component in the direction of the object short axis which is set to be zero, and outputting a motion instruction to drive the robot arm.

* * * * *